(12) United States Patent
Deeds et al.

(10) Patent No.: US 6,810,238 B1
(45) Date of Patent: Oct. 26, 2004

(54) EXTENSION MODULE FOR A PORTABLE DEVICE

(75) Inventors: Douglas Deeds, Fort Worth, TX (US); George Bernhart, Trophy Club, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 259 days.

(21) Appl. No.: 09/693,485

(22) Filed: Oct. 20, 2000

(51) Int. Cl.[7] .................................................. H24B 1/83
(52) U.S. Cl. ...................... 455/90.1; 455/569; 455/552; 455/554.2; 455/568.1; 455/568.2; 455/568.3; 455/568.4; 455/568.5; 455/568.6; 210/1
(58) Field of Search ................................ 455/569, 552, 455/90.1, 525.1, 568.1, 568.2, 568.3, 568.4, 568.5, 568.6; 210/1

(56) References Cited

U.S. PATENT DOCUMENTS

| | | |
|---|---|---|
| 5,438,359 A | 8/1995 | Aoki |
| 5,475,441 A | 12/1995 | Parulski et al. |
| 5,754,962 A * | 5/1998 | Griffin ........................ 455/569 |
| 6,002,921 A * | 12/1999 | Pfahlert et al. ............... 455/90 |
| 6,219,560 B1 | 4/2001 | Erkkila et al. |
| 6,272,359 B1 | 8/2001 | Kivela et al. |
| 6,272,575 B1 | 8/2001 | Rajchel |
| 6,424,842 B1 * | 7/2002 | Winstead ..................... 455/557 |
| 6,480,724 B1 | 11/2002 | Erkkila et al. |
| 6,496,874 B1 * | 12/2002 | Janky et al. ................... 710/1 |

FOREIGN PATENT DOCUMENTS

| | | |
|---|---|---|
| GB | 2 289 555 | 11/1995 |
| WO | WO 00/42744 | 7/2000 |
| WO | WO 01/29925 | 4/2001 |
| WO | WO 02/089548 A1 | 11/2002 |

OTHER PUBLICATIONS

U.S. patent application Ser. No. 09/590,512, Holtorf et al., filed Jun. 9, 2000.
U.S. patent application Ser. No. 09/590,513, Gartrell, filed Jun. 9, 2000.

* cited by examiner

*Primary Examiner*—Erika Gary
*Assistant Examiner*—David Nguyen
(74) *Attorney, Agent, or Firm*—Robert C. Rolnik; Steven A. Shaw; Alston & Bird LLP

(57) ABSTRACT

An extender module (300) capable of being firmly mounted to a mobile station via mounting points (331, 332, 333, 334) is provided. Extender module has a base portion (305) which may support a conduit (320) which extends from a upward facing connector (323) to a downward facing connector (321). Shell bottom may have a connector that duplicates one or more contact pads (380) of a mobile station (390). A duplicated contact pad (321) may appear on the extender module shell bottom.

7 Claims, 4 Drawing Sheets

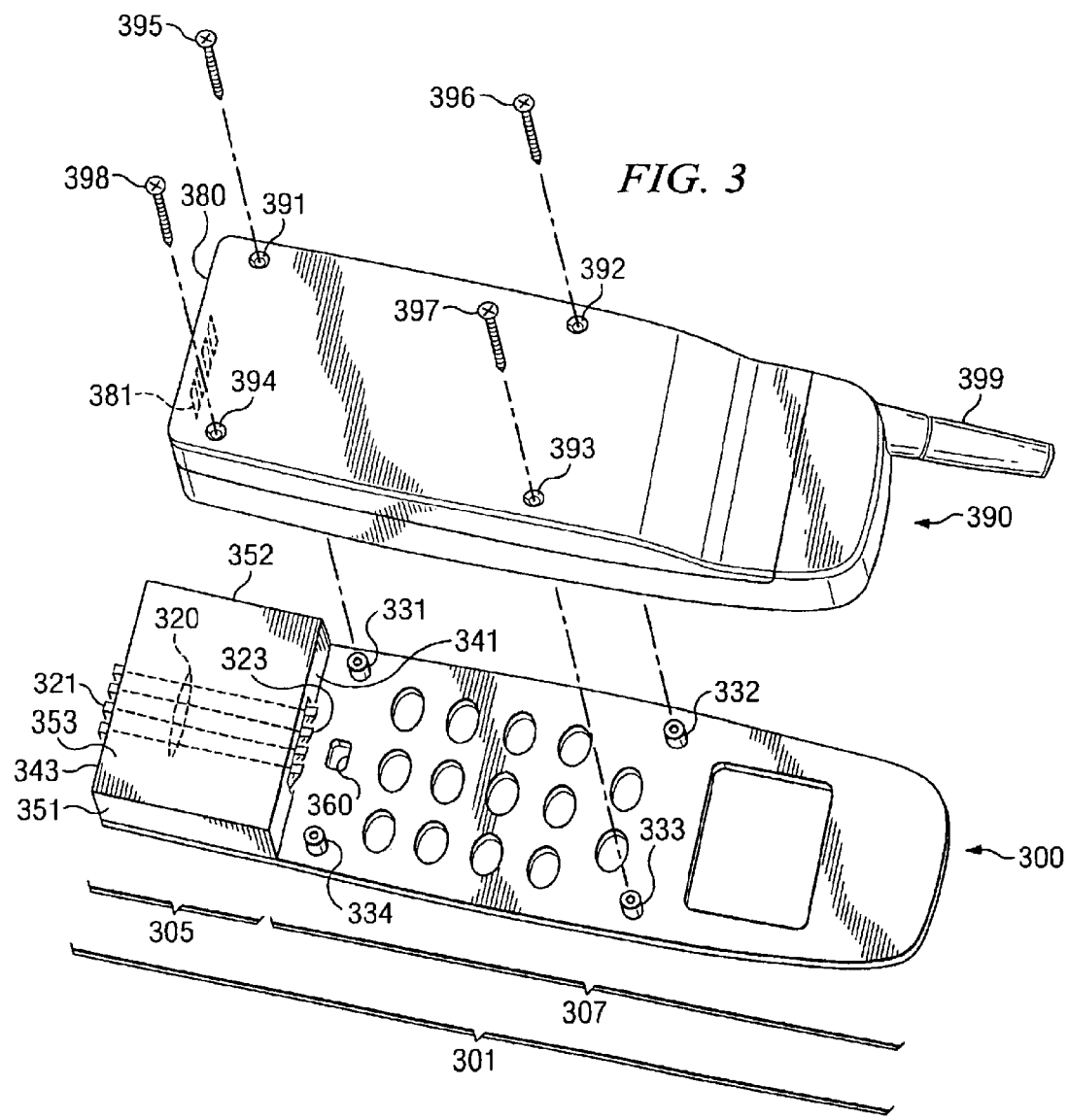

EXTENSION MODULE FOR A PORTABLE DEVICE

FIELD OF THE INVENTION

The invention relates to providing extension modules for portable devices in order to accommodate additional functionality, and more particularly to extending an electrical interface on a mobile station while providing shelter to electronics inside the shell of an extender module.

BACKGROUND OF THE INVENTION

Many communication stations such as a mobile phone today now have a low-power microprocessor within it. The versatility of the keypad user-interface and display gives some mobile phones the rudimentary capabilities of larger desktop computers. Because of the processing capabilities, combined with the communications capabilities of the modern mobile phone, there is an interest in adding on functionality, much the same way functionality is added to computers.

The acceptable form factor, i.e. the physical feel and size, for a mobile phone, is usually quite small, however. Frequently, the mobile phone or other mobile station is stored in a pocket or handbag. Some people treat such devices as a fashion accessory, preferring to display a phone while clipped onto, e.g. a belt. Because the market forces have driven such devices to small form factors, it is difficult to justify the provision of card slots, or motherboards to such a device.

Because of the particular use the mobile station is employed in, only minimum space and weight is allocated to docking the device to other devices. For example, two common accessories to dock to a mobile station's docking connector are a) a power receptacle for bypassing internal batteries and/or charging of batteries; and b) a headset arrangement for providing two-way audio signals. The number of lead outputs necessary for such accessories is only a few. Thus, very little has been done to provide either strong mechanical connections durable for larger accessories; or high-bandwidth parallel signal interconnects, as are used, e.g. in the DB-25 computer standard.

Since interconnect to accessories or other modules is a secondary function to particularly mobile phones, such connections have evolved much later in the development of such devices.

Mobile stations frequently come in a form factor having three dimensions: height, width and thickness. A linear antenna, if a part of the mobile station, is typically oriented along the height dimension. A contoured front or cover to the mobile station is typically oriented along the dimensions of height and width. The height and width, are often the largest dimensions on the device, and a dimension of thickness extends between the front and the back of the mobile station.

Earlier attempts to build on optional functionality to a mobile station include providing one or more slide-on modules that affix to the back of the mobile station, thereby increasing the thickness of the device. Some such modules, increase the thickness so that the device is nearly as thick as the device is wide. While thickness is highly desirable in a wallet, it is seldom appreciated in a mobile phone, particularly when a thick phone is placed in a pants pocket. Such a design does have a redeeming virtue though. The slide-in module shares a broad common wall and rigidly connects along the outer perimeter of the mobile station's silhouette. The profile or thickness of the slide-in module is also lower than the width of the slide-in module—so there is little opportunity for a multiplication of force as might be caused by a high-profile, low-width module. In short, the slide-in module that attaches to the back of the mobile phone has a solid fit, and is not prone to dislodgment or failure when a lateral force is applied.

Nevertheless, any device that adds substantially to the thickness of the device may cause other problems. Some accessories accommodate only limited expansions in thickness. For example, a mobile phone charger stand typically props a mobile phone upright in a shallow pocket. The thickness of the opening of the pocket is the limiting factor for expansions in mobile phone thickness. So additional backside modules for a mobile phone may reduce the flexibility of support and charging available for users of the mobile phone.

Some after-market suppliers of accessories to phones provide new features and accessories by adding connector converters to the base of a mobile phone. As an example, Plantronics provides an adapter that converts a flat or planar connector at the base of a mobile phone to a jack receptacle. Such a connector extends in a length dimension from the mobile phone. If one considers the base of the adapter to be the junction where the adapter fastens to the mobile phone, the length of the adapter is much greater than any dimension of the base of the adapter. Any force appearing at orthogonal to the length at the outer extremity of the adapter (or lateral force), will cause the adapter to operate like a lever, and produce high levels of strain at the base, where the adapter latches in place. This leads to adapters shearing off at the mounting point where the adapter latches to the mobile phone.

The lever effect causes greater problems when a long adapter is attached to the base of a phone. Additional support, or protection, is needed against the occasional lateral force.

Some mobile phones have interchangeable covers. The cover often has holes for ingress and escape of sound or for buttons and other user interfaces. Generally, the cover extends to the edges of the front view of the mobile phone, i.e. covering the silhouette of the mobile phone. Though the cover may not cover the antenna, at least the base silhouette of most mobile phones is covered. The attachment of an adapter, or module, then, extends beyond the cover.

As mentioned, most manufacturers have made mobile phones to an acceptably small form factor for most consumers. Now it appears that a modest increase in length is acceptable, providing a significant new functionality is available. Because the typical mobile station offers enormous convenience in terms of battery charging, user interface, and portability, many electronics manufacturers want to make devices that share the battery, user interface and other hardware of the mobile station to provide increased usability by consumers. An MP3 player may be trimmed down in size substantially if a) the power source is external, b) the display and buttons are not required c) some ability to absorb shock is built into a host device. Much the same can be said for short-range radio frequency data transceivers, global positioning satellite receivers and many more hand-held devices.

To provide a means of interconnecting new modules in a manner acceptable to consumers, a maximum form factor must be observed, vibration and shock must be minimized to a module, and uniform profiles and contours should be maintained for module-augmented devices for continuing interoperability with accessories to a mobile station.

SUMMARY OF THE INVENTION

According to one or more embodiments, a mobile station with a docking connector is provided with an extender module. The embodiment may have a mobile station cover having a base portion and an upper portion. The upper portion mounts to the mobile station by at least one mounting point. The base portion of the embodiment has an upward facing connector that connects to the base of the mobile station. The base portion of the embodiment has a downward facing connector that has a shape the same as mobile station docking connector.

Another embodiment includes a shell that supports a first connector that is shaped to mateably engage a docking connector at the base of a mobile station. The first connector provides several conductors to a second connector at a distant end of the shell. The second connector has the same shape as the docking connector of the mobile station. The shell may be the same thickness as the mobile station. The shell may provide mounting points to be attached to an extended mobile station cover.

Embodiments of the invention could be used to provide a volume of space for electronics ancillary to the mobile station. An embodiment that has a mobile station cover embedded in it may provide a rigid and firm connection between the embodiment and the mobile station. In addition, more customized operation of a mobile station may be obtained when a user selects functionality provided as an after-market addition to the mobile station, wherein the functionality is electronics sheltered in an embodiment.

BRIEF DESCRIPTION OF THE DRAWINGS

The disclosed inventions will be described with reference to the accompanying drawings, which show important sample embodiments of the invention, wherein:

FIG. 3 shows a exploded diagram of an extender module embodiment of the invention and a mobile station.

DETAILED DESCRIPTION OF THE PREFERRED EMBODIMENTS

Figure 1A:
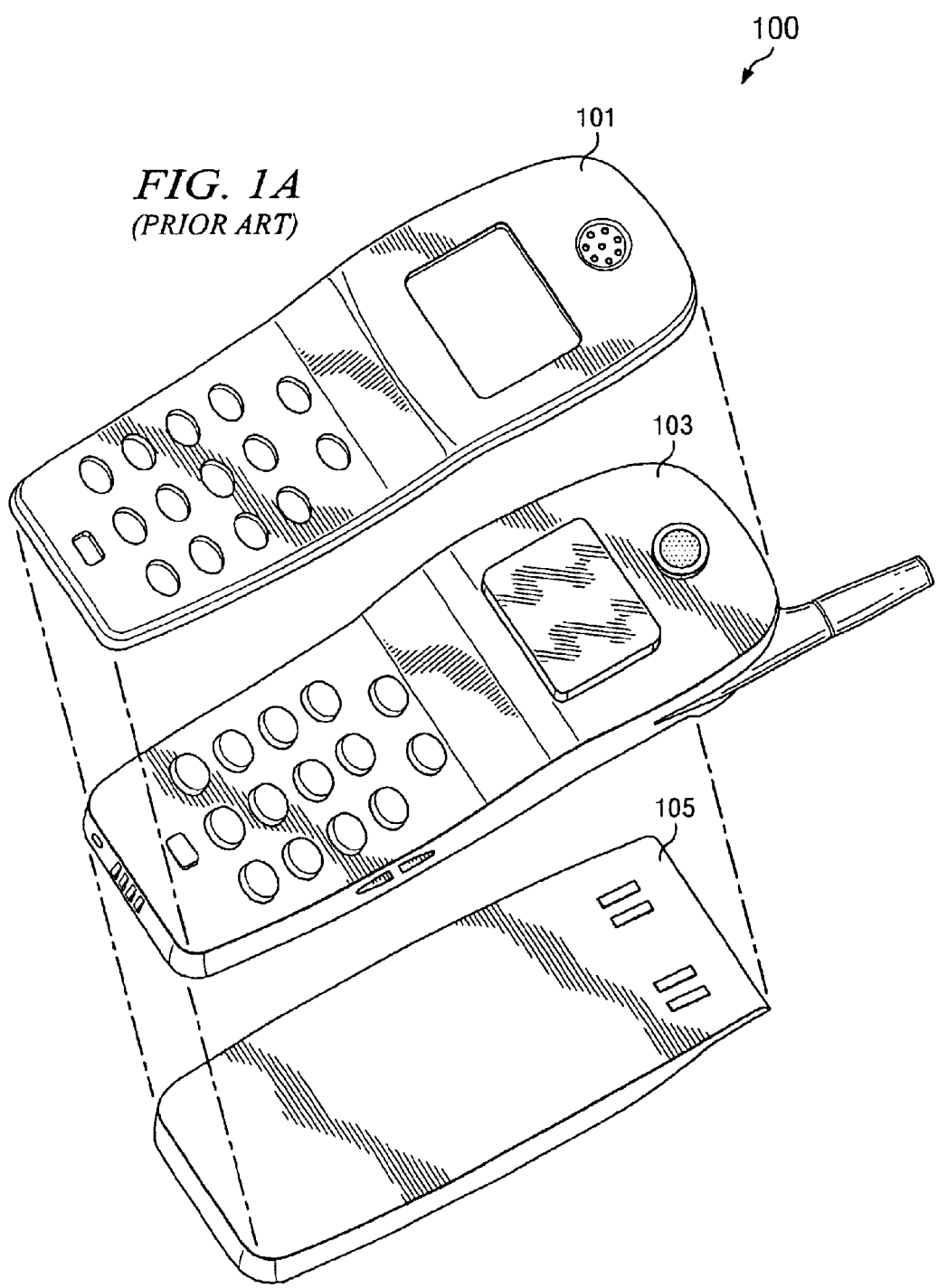
FIG. 1A shows an exploded diagram of a prior art mobile station.

FIG. 1A shows an exploded view of a prior art mobile station 100. The parts of the mobile station may include a cover 101, the chassis with operational electronics of the mobile station 103 and a battery 105. A mobile station may come with a cover 103 or a battery 105 or both.

Figure 1B:
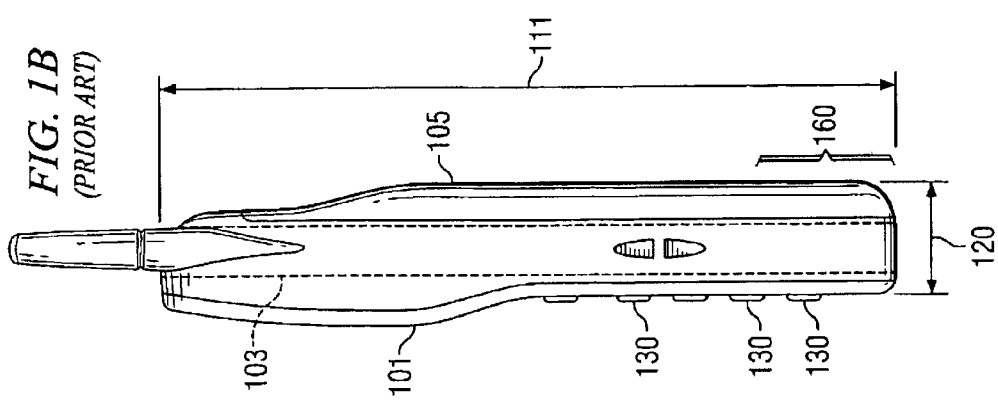
FIG. 1B shows a side view of a prior art mobile station.

FIG. 1B shows a side view of the base portion of a mobile station having a battery 105 and a front cover 101. The mobile station, in its various forms, has three dimensions, which include length 111, and at least one thickness 120. The dimension of thickness has several possible meanings. In all cases, thickness does not include any contribution of deformable keypad parts 130, nor roller wheels, nor any other mechanical user input that protrudes from the mobile station case. Thickness of a mobile station configuration includes the chassis with operational electronics of the mobile station 103, and may include the cover 101 and the battery 105. The base thickness is a measurement of the mobile station from front to back at the mobile station base 160. The base thickness is the chassis with operational electronics and may include the thickness of the cover 101 and the battery 105.

Figure 2A:
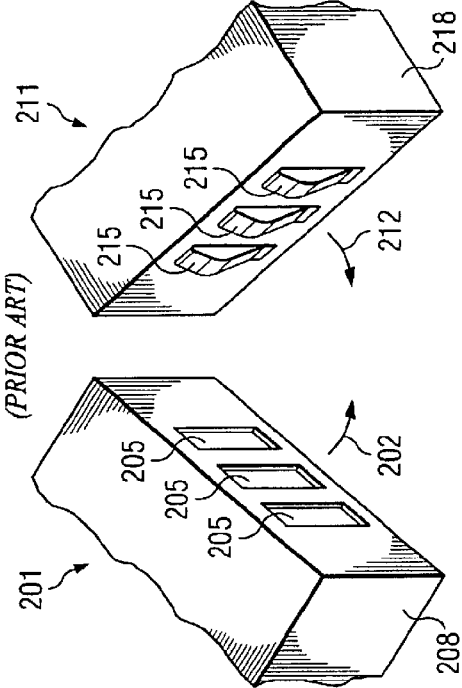
FIGS. 2A shows an exploded diagram of a prior art planar connector and a prior art mating spring-loaded connector.

FIG. 2A shows a prior art planar connector 201, and a mating spring-loaded connector 211. Planar connector 201 has a several conductive contact pads 205 shaped to be flat. Spring-loaded connector 211 has several conductors 215 that have an outward bias and may have a convex shape. Planar connector 201 faces a direction 202. Spring-loaded connector 211 faces a direction 212. The direction a connector faces 202 is outward in the sense that a connector has internal permanent connections to printed circuit boards, cable assemblies, among others, and the connector extends away from those printed circuit boards in the outward direction. Such a direction may be orthogonal to a plane of conductors that make up various contact pads 205 for a connector. Parts of the conductive contact pads 205 or conductors 215 may be recessed within a non-conducting frame 208 and 218.

Figure 2B:
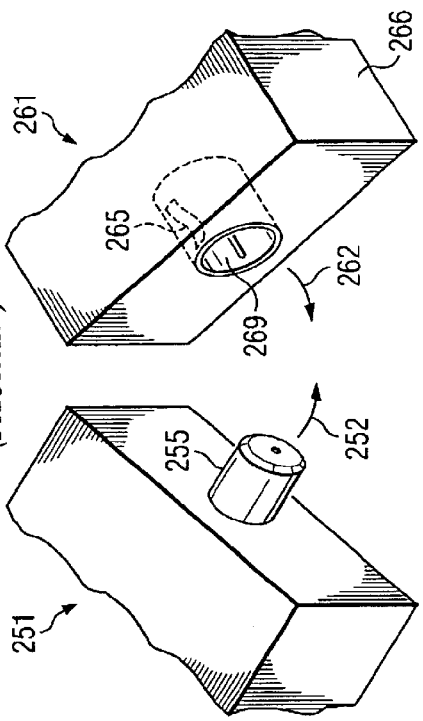
FIG. 2B shows a exploded diagram of a prior art coaxial male connector and prior art coaxial female connector.

FIG. 2B shows a prior art coaxial male connector 251, and a coaxial female connector 261. The coaxial male connector 251 may have at least one cylindrical conductor 255. The coaxial female connector may have at least one biased conductor 265 that engages the cylindrical conductor 265. The coaxial male connector 251 faces a direction 252, which points outward. Similarly, the coaxial female connector 261 faces a direction 262, which is outward from any casing 266 that provides an opening 269 that permits the coaxial male connector 251 to be inserted.

In each case where there are two connectors that are mateable with each other, a first connector faces in one direction, and the second connector faces in virtually the opposite direction, when the connectors are engaged together to form a linked conductor suitable for carrying electricity. By mateable, it is meant that the connectors may interconnect together, i.e. that the connectors are interconnectable such that signals may pass from one connector to a second connector. An interconnection of two connectors may resist disconnection because of friction, spring biasing, latches, screws or other interconnection means at or near the connectors.

FIG. 3 shows an exploded view of an enhancement enclosure 300 or extender with a prior art mobile station 390, which may be a mobile phone. The enhancement enclosure may be attached to the mobile station at four mounting points 391, 392, 393, 394, which may be holes in the back of the mobile station. Each mounting point may have a corresponding screw 395, 396, 397, and 398. Other means for mounting are known as the art, such as biased latches.

The enhancement enclosure 300 has a front panel 301, which has two broad regions: a lower cover or base portion 305 and a upper cover or upper portion 307. The upper cover 307 may be sized to roughly match the silhouette of the mobile station 390 except for necessary user interface openings for sound, buttons and other parts, but not any protruding portions, such as, e.g. the antenna 399. In other words, the upper cover 307 may cover the front view of the mobile station. The upper cover 307 if sized to match the silhouette of the mobile station 390 except user interfaces and antennas, is called a longitudinal mobile station cover. The upper cover provides better stability for the combined enhancement enclosure 300 and mobile station 390 when the upper cover 307 is at least as long as the lower cover 305. The lower cover, together with the first side panel 351, the second side panel 352, and the back panel 353 form at least one cross section. The upper cover may have recesses or holes to operate as mounting points 331, 332, 333, 334 for a mobile station to be installed, e.g. by use of at least one screw.

The mobile station may have electrical connectors at the base 380. Such connectors or collectively, docking connector 381, may provide an interface to power systems internal to the mobile station, as well as computer, user interface and any other on board systems. The docking connector 381 generally faces downward and has a shape to the one or more electrical connectors that presents such electrical connectors for attachment by friction or other means to conductors of a counterpart electrical connector, which may be a connector in an accessory such as a desk charger.

Enhancement enclosure 300 may provide a conduit 320 that carries signals presented at a mobile connector 323 to an accessory connector 321 at a remote part of the enhancement enclosure. Such signals may be from a mobile station that is attached to the enhancement enclosure at the mounting points, wherein the docking connector mateably engages the mobile connector 323. The docking connector 381 may face downward. Such a conduit may include at least one extender conductor, or other signal carrying apparatus. The conduit may include several conductors arranged in parallel. The conduit may have semiconductors interposed in series with a extender conductor. Semiconductors may provide impedance matching so that remote speakers and microphones of a headset assembly may be connected through the conduit. The semiconductors may provide other functions.

The mobile connector 323 may be mateable to a mobile station docking connector 381. Such a mobile connector 323 may be opposite in orientation and polarity to the docking 381 connector, i.e. the mobile connector 323 may be a upward facing connector. The conduit 320, for protection against shock, bending, torque and the elements, may be located within several panels of the enhancement enclosure 300. The mobile station 390, once mounted to the enhancement enclosure 300, has a docking connector which faces a direction and has a contact with a shape, and an accessory connector 321 of the enhancement enclosure, which also has at least one contact having the same shape and direction.

One or more of the panels may form a shell. A shell provides shelter against shock or foreign objects that may be introduced from at least one direction. A panel may be flat or rounded. The panels include a first side panel 351, a second side panel 352, a back panel 353 and a front base portion of the front panel 335. It is appreciated that the panels may have sharp junctions between them that look like corners. Alternatively, the panels may blend in a rounded curve with each other. The terms side panel, back panel and front panel are understood to mean any molded part or parts that generally face in directions orthogonal to each other, but with wide tolerances to allow curving. The combined panels need not be square, and can even take shapes that are spherical or ellipsoidal. The shell may substantially enclose at least one extender conductor of a conduit 320. Regardless of the final shape, at least base of the extender module should conform in shape to the base of the mobile station, in order to allow a proper fit with a desk charger or other accessory.

The shell has a shell top near the mobile connector 323, which may support the mobile connector 323. The shell has a shell bottom near the accessory connector 321, which may support the accessory connector 321. Conduit 320 may pass from a shell top 341 to the shell bottom 343. Shell top 341 is generally an edge to the shell that is near the upper cover 307. Shell bottom 343 is generally an edge of the shell that is near the lower cover 305 of the enhancement enclosure.

Parallel circuits, taps and other junctions that interoperate with active circuits elements housed within the enhancement enclosure 300 may modify the conduit signals so that signals appearing at the mobile connector 323 may be attenuated at the accessory connector 321. A principal purpose of the enhancement enclosure is to provide supporting structure and shelter for such parallel circuits, and other active circuit elements.

Enhancement enclosure 300 may provide additional conduits for proper operation of mobile station or mobile phone. Most mobile phones have a hole or other gap in the housing to permit sound ingress to a microphone that is largely sheltered within. Since the microphone is typically positioned in the base of the mobile station, a microphone port 360 is located near the junction 306 between the lower cover 305 and the upper cover 307. Such a hole is provided so that sound waves appearing in the hole travel quickly to the microphone, and any existing holes in the mobile station base are not blocked.

Figure 4:
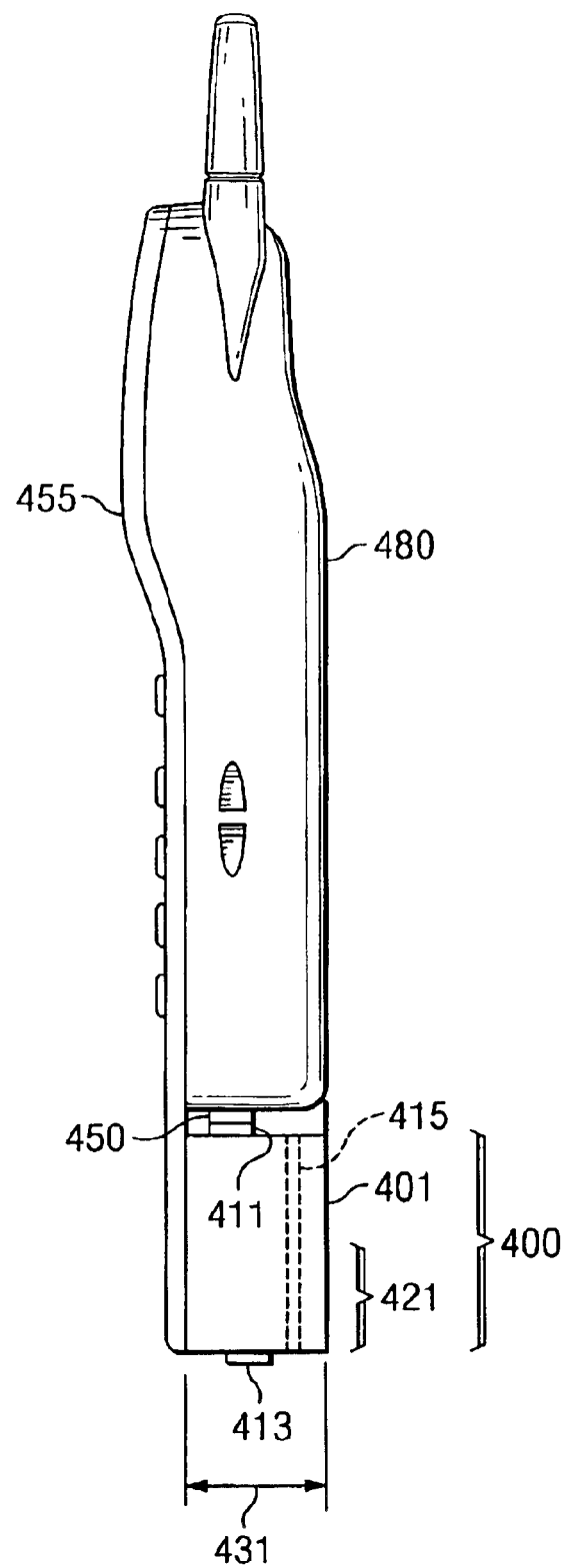
FIG. 4 shows a side view of a second embodiment of the invention with a mobile station.

FIG. 4 shows a second embodiment of the invention connected to the prior art mobile station 480. An extension module 400 has a shell 401 that is comprised of one or more panels that may be connected together. One or more of the panels supports an upward facing electrical connector 411, which may be comprised of one or more contact pads. One or more of the panels supports a downward facing electrical connector 413. Upward facing electrical connector may be a coaxial connector or a planar connector, but the upward facing electrical connector 413 must be in the same configuration to mateably engage at least one mobile station connector 450. Similarly, the downward facing electrical connector must be in the same configuration to mateably engage at least one connector counterpart to at least one mobile station connector.

The extender module 400 has at least one thickness 431, a width and a length. A shell 401 may extend most of the length, wherein part of the length is made up of any protruding parts of a connector, which may include an upward facing electrical connector or downward facing connector. The shell thickness may swell at some points along the length, but the thickness must be sufficiently thin at a distant part 421 of the shell to permit docking with accessories, which may include a charger. Holes may be located on any part of the shell. Such holes may permit buttons, sound or user interfaces to extend through the shell to an interior part of the extension module 400. The extender module may have a printed wiring board 415 upon which conductors may extend from the upward facing connector. The shell may support the printed wiring board 415.

The extender is preferably substantially rigid, but parts of it may be elastic where mechanical shock is likely to occur. The upward facing connector 411 and the downward facing connector 413 may have very little flexibility in the orientation of each to the other. This aspect permits a mobile station that is docked to the extender to remain largely upright when the combined mobile station and extender are inserted into a charger, car kit, or other accessory.

An extended cover 455 may be added to the extender module, and a mobile station, wherein the mobile station does not already have a cover. The extended cover 455 may offer greater rigidity to the combined mobile station and extender module. The extended cover 455 may be attached by screws or other means known in the art to the extender module 400. The extended cover may be used on the front of the combined mobile station and extender module. Alternatively, an extended cover may be used on the back of the combined mobile station and extender module.

Although the invention has been described in the context of particular embodiments, various alternative embodiments are possible. Thus, while the invention has been particularly shown and described with respect to specific embodiments thereof, it will be understood by those skilled in the art that changes in form and configuration may be made therein without departing from the scope and spirit of the invention.

What is claimed is:

1. A mobile station cover for providing an extension to a mobile station having a docking connector, the mobile station cover comprising:

an upper portion and a base portion, the upper portion having a main face surface facing a user during normal operation and defining apertures associated with respective keys of a keypad, the upper portion extending in a first direction opposite form a second direction beyond a silhouette of the mobile station, wherein the upper portion is sized to match the silhouette of the mobile station, the base portion comprising:

a first side panel extending away from the main face surface;

a second side panel extending away from main face surface; and a back panel joining the first side panel and the second side panel to form an enclosure;

a first electrical connector having at least one conductor facing in the first direction, the first electrical connector housed within the enclosure and supported by the base portion; and a second electrical connector coupled to the conductor and facing the second direction, the second electrical connector housed within the enclosure and supported by the base portion.

2. The mobile station cover of claim 1 having at least one mounting point.

3. The mobile station cover of claim 2 wherein the at least one mounting point is mateably engageable to a mobile station chassis.

4. The mobile station cover of claim 1 wherein the at least one conductor is supported by a printed wiring board, the printed wiring board supported by the base portion.

5. The mobile station cover of claim 4 wherein the printed wiring board has at least one semiconductor, the at least one semiconductor operatively coupled to the at least one conductor.

6. The mobile station cover of claim 1 wherein the docking connector has a quantity of docking conductors, and the least one conductor comprises an equal quantity of conductors.

7. The mobile station cover of claim 1 wherein the extender further comprises a shell that extends from the mobile station cover around the at least one conductor.

\* \* \* \* \*